No. 645,268. Patented Mar. 13, 1900.
R. M. MICHAEL.
POTATO FORK ATTACHMENT.
(Application filed Nov. 13, 1899.)
(No Model.)
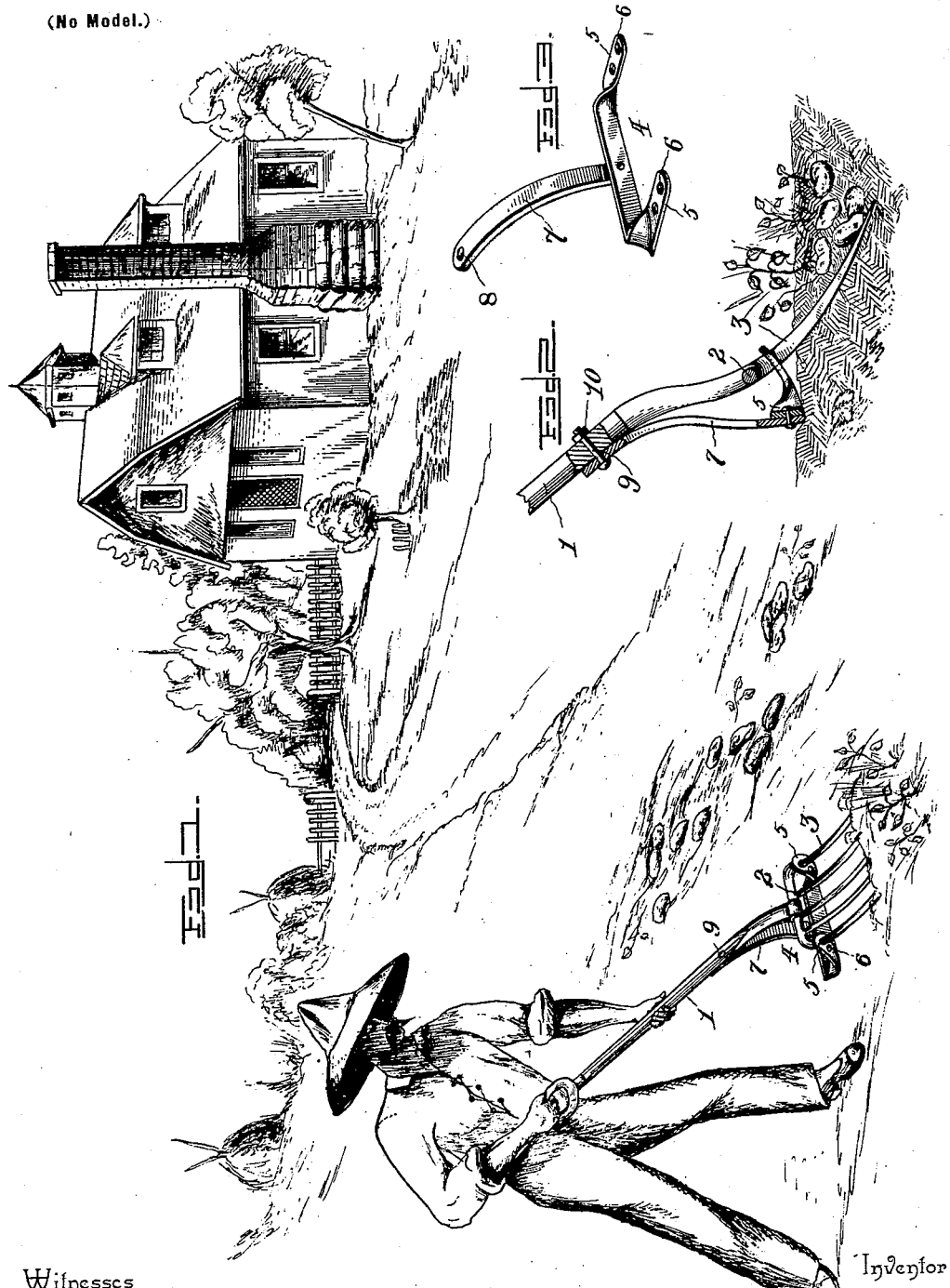
Witnesses
Inventor
R. M. Michael.

UNITED STATES PATENT OFFICE.

ROBERT M. MICHAEL, OF LAPEER, MICHIGAN.

POTATO-FORK ATTACHMENT.

SPECIFICATION forming part of Letters Patent No. 645,268, dated March 13, 1900.

Application filed November 13, 1899. Serial No. 736,807. (No model.)

*To all whom it may concern:*

Be it known that I, ROBERT M. MICHAEL, a citizen of the United States, residing at Lapeer, in the county of Lapeer and State of Michigan, have invented a new and useful Potato-Fork Attachment, of which the following is a specification.

This invention relates to potato-forks and like agricultural implements, and has for its object to provide an attachment therefor which is designed to form a fulcrum, so as to facilitate the digging of potatoes, weeding, and like operations.

It is furthermore designed to provide a device which may be conveniently applied to and removed from a fork without altering or changing the latter and which will serve as an additional fastening between the head of the fork and the handle.

To these ends the present invention consists in the combination and arrangement of parts, as will be hereinafter more fully described, shown in the accompanying drawings, and particularly pointed out in the appended claims, it being understood that changes in the form, proportion, size, and minor details may be made within the scope of the appended claims without departing from the spirit or sacrificing any of the advantages of the invention.

In the drawings, Figure 1 is a perspective view of a potato-fork having the present attachment applied thereto. Fig. 2 is a detail longitudinal sectional view, on an enlarged scale, of the fork. Fig. 3 is a detail perspective view of the attachment.

Corresponding parts in the several figures of the drawings are designated by like characters of reference.

Referring to the accompanying drawings, 1 designates the handle of the fork, and 2 the fork-head, which is connected to the lower end of the handle in any preferred manner and is also provided with the usual prongs or tines 3.

The present attachment is best shown in Fig. 3, and comprises a substantially U-shaped metallic body 4, the opposite sides or arms 5 being disposed substantially horizontally and provided with a plurality of perforations 6. Extending rearwardly from an intermediate point of the transverse portion of the body is a bowed shank 7, which is provided at its rear extremity with a perforation 8.

In the application of the device corresponding perforations in the arms 5 receive the respective outer prongs of the fork, and the device is located adjacent to and beneath the head of the fork. The rear end of the shank 7 rests against the under side of the handle 1, at a suitable distance in rear of the head of the fork, and is detachably connected to the handle by means of a bolt 9, extending through the perforation 8 and also through the handle and provided upon its projecting threaded end with a nut 10.

In the operation of the attachment, as best illustrated in Fig. 2 of the drawings, it will be seen that the transverse portion of the U-shaped body rests upon the surface of the ground, so as to form a fulcrum-point for the implement when the rear end of the handle is forced downward to raise the points of the prongs out of the ground.

It will be apparent that the present device may be applied to any common pitchfork, potato-fork, or like agricultural implement without altering the form or construction thereof and only requires the provision of an opening formed through the handle of the implement for the reception of the attaching-bolt 9. Furthermore, the device may be conveniently applied and detached, so that a single fork may be equipped with a fulcrum when it is desired to dig potatoes or to perform any like operation, and the device may be removed when it is desired to pitch or turn hay, as in such latter operation it is desirable to dispense with the additional weight of the fulcrum attachment. Also the device provides an additional fastening between the fork and the handle thereof and braces these parts when the attachment is in use, thereby preventing breaking of the handle and also weakening or loosening of the connection between the handle and the fork-head. Moreover, any of the corresponding perforations 6 may receive respective tines of the fork, whereby the attachment may be adjusted transversely toward and away from the fork and in a plane at substantially right angles thereto, so as to obtain a greater or less purchase, as may be required.

What is claimed is—

1. The combination with a potato-fork comprising a handle, and a fork proper, of a fulcrum attachment, having a transversely-adjustable connection with the fork.

2. The combination with a potato-fork, of a fulcrum attachment, which is adjustable toward and away from the fork.

3. The combination with a potato-fork, comprising a handle, and a fork proper, of a fulcrum attachment, having perforations receiving respective prongs of the fork, and also having a connection with the handle of the implement.

4. The combination with a potato-fork, comprising a handle, and a fork proper, of a substantially U-shaped fulcrum attachment, having its opposite sides provided with perforations receiving the respective prongs of the fork, and a rearwardly-extending shank detachably connected to the under or rear side of the handle of the implement.

5. A fulcrum attachment for a potato-fork, comprising a substantially U-shaped body, the opposite sides of which are disposed in a substantially-horizontal plane, and are provided with corresponding perforations, and a bowed shank, extending rearwardly from an intermediate point of the transverse portion of the body, and provided at its rear end with a perforation, and a fastening fitting in said perforation.

6. The combination with a potato-fork, having tines, of a fulcrum attachment, having a plurality of corresponding openings or perforations adjustably receiving respective tines of the fork.

In testimony that I claim the foregoing as my own I have hereto affixed my signature in the presence of two witnesses.

ROBERT M. MICHAEL.

Witnesses:
J. H. BIDWELL,
G. W. MAHON.